United States Patent
Schüepp

(10) Patent No.: US 9,940,055 B2
(45) Date of Patent: Apr. 10, 2018

(54) OPERATOR PANEL WITH APPLICATIONS FOR OPERATING PRODUCTION SYSTEMS

(71) Applicant: Ferag AG, Hinwil (CH)

(72) Inventor: Michael Schüepp, Illnau (CH)

(73) Assignee: FERAG AG, Hinwil (CH)

(*) Notice: Subject to any disclaimer, the term of this patent is extended or adjusted under 35 U.S.C. 154(b) by 458 days.

(21) Appl. No.: 14/032,100

(22) Filed: Sep. 19, 2013

(65) Prior Publication Data
US 2014/0082312 A1  Mar. 20, 2014

(30) Foreign Application Priority Data

Sep. 20, 2012 (CH) ...................................... 1707/12

(51) Int. Cl.
| | | |
|---|---|---|
| *G06F 3/06* | (2006.01) | |
| *G05B 19/042* | (2006.01) | |
| *G06F 9/44* | (2018.01) | |
| *G06F 9/445* | (2018.01) | |

(52) U.S. Cl.
CPC ........ *G06F 3/0634* (2013.01); *G05B 19/0428* (2013.01); *G06F 3/067* (2013.01); *G06F 3/0619* (2013.01); *G06F 9/4443* (2013.01); *G06F 9/44505* (2013.01); *G05B 2219/2237* (2013.01); *G05B 2219/23043* (2013.01); *G05B 2219/23067* (2013.01); *G05B 2219/23081* (2013.01); *G05B 2219/24192* (2013.01)

(58) Field of Classification Search
CPC ........ G06F 3/0634; G06F 8/65; G06F 9/4443; G06F 9/44505; G06F 3/0619; G06F 3/067

USPC ........................................................ 717/121
See application file for complete search history.

(56) References Cited

U.S. PATENT DOCUMENTS

| | | | | |
|---|---|---|---|---|
| 5,742,792 A * | 4/1998 | Yanai | .................... | G06F 3/0601 710/1 |
| 6,161,176 A * | 12/2000 | Hunter et al. | .................... | 713/1 |
| 7,966,391 B2 * | 6/2011 | Anderson | ............... | H04L 41/28 703/22 |
| 8,904,074 B2 * | 12/2014 | Lee et al. | ....................... | 710/110 |
| 2004/0172423 A1 * | 9/2004 | Kaasten | ............ | G06F 17/30176 |
| 2006/0179432 A1 * | 8/2006 | Walinga | ............... | H04L 41/0806 717/171 |

(Continued)

*Primary Examiner* — Marina Lee
(74) *Attorney, Agent, or Firm* — Knobbe, Martens, Olson & Bear LLP

(57) ABSTRACT

The invention relates to an operator panel (1) having one or more applications (121, 122) for operating at least one production system (2). A configuration data memory (13) is set up to store configuration data that are provided for configuring the one or more applications (121, 122) of the operator panel (1). A synchronization module (14) is set up to access configuration data stored in the configuration data memory (13) and to synchronize these data via a communications interface (11) of the operator panel (1) with configuration data that are stored in a configuration data memory (13', 13") of a remotely disposed operator panel (1', 1"). A configuration access module (15) is set up to receive from at least one application (121, 122) of the operator panel (1) a read request for stored configuration data, to access stored configuration data, and to read the stored configuration data corresponding to the read request and to deliver the read configuration data for configuring the at least one application (121, 122) to the at least one application (121, 122).

15 Claims, 3 Drawing Sheets

(56) References Cited

U.S. PATENT DOCUMENTS

| | | | |
|---|---|---|---|
| 2007/0234108 A1* | 10/2007 | Cox | G06F 11/2058 714/6.12 |
| 2008/0092131 A1* | 4/2008 | McIntyre et al. | 717/172 |
| 2008/0155058 A1* | 6/2008 | Prasad | H04L 67/1095 709/218 |
| 2009/0172223 A1* | 7/2009 | Lee et al. | 710/104 |
| 2010/0223493 A1* | 9/2010 | Brunner | 714/4 |
| 2013/0332575 A1* | 12/2013 | Song | H04L 67/10 709/219 |
| 2013/0339833 A1* | 12/2013 | Chen | G06F 17/211 715/220 |
| 2014/0082312 A1* | 3/2014 | Schuepp | G05B 19/0428 711/162 |
| 2014/0143446 A1* | 5/2014 | Jacobson | H04L 67/1095 709/248 |
| 2014/0250069 A1* | 9/2014 | Lakshminarayanan | G06F 17/30575 707/634 |

* cited by examiner

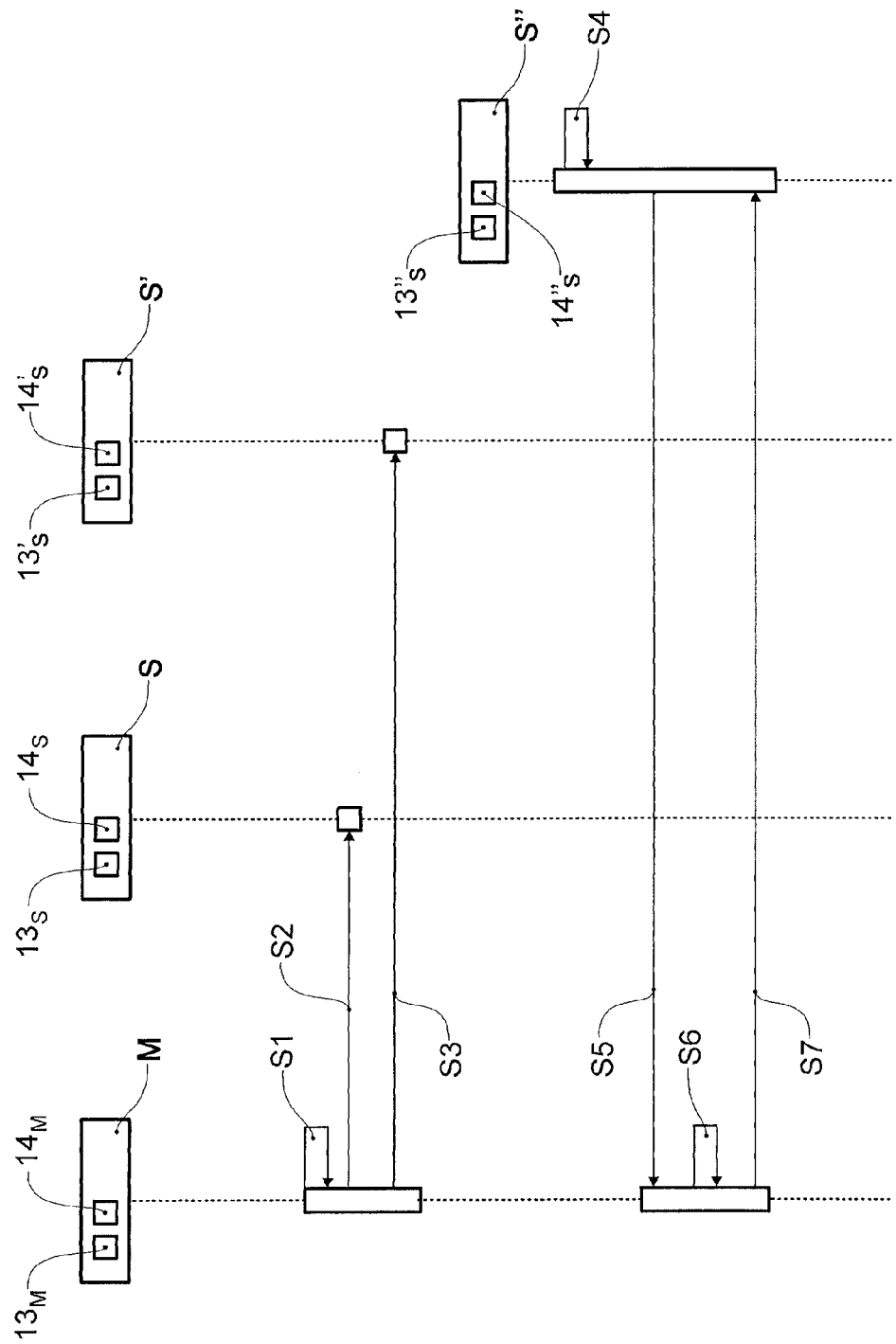

OPERATOR PANEL WITH APPLICATIONS FOR OPERATING PRODUCTION SYSTEMS

CROSS-REFERENCE TO RELATED APPLICATIONS

This application claims priority to Swiss Application No. 01707/12, filed Sep. 20, 2012.

TECHNICAL FIELD

The invention relates to an operator panel having one or more applications for operating at least one production system and to a method for operating an operator panel having one or more applications for operating at least one production system.

DESCRIPTION OF THE RELATED ART

Production systems such as for instance product processing systems or printed product processing systems are known from the prior art. These are highly complex and extensive systems that, depending on the application, are arranged in very large structures, frequently in several buildings and rooms. Production systems are operated by at least one user and at least one operator panel. Depending on the location, a user may for instance use different operator panels to operate the production system. For operating the production system, the operator panel must be configured according to the production system. For instance, when the production system is equipped with a new machine part, the operator panels must be set up for operating this machine part. For instance, one application of the operator panel is configured with configuration data such that the operator panels may be used to start the machine part, stop the machine part, adjust the speed of the machine part, etc. When there is a large number of operator panels, configuring the relevant operator panels is very complicated. When operating the production system, one or a plurality of users employ personal user settings on one or a plurality of operator panels, for instance, which then are not automatically available when operating with a different operator panel, however.

SUMMARY

It is an object of the present invention to suggest an operator panel and a method for operating an operator panel having one or more applications for operating at least one production system, which operator panel and method prevent or reduce at least certain drawbacks of the prior art. It is in particular an object of the present invention to suggest an operator panel and a method for operating an operator panel having one or more applications for operating at least one production system, which operator panel and method in a group of a plurality of operator panels for the production system lead to a consistent configuration of the operator panels. It is in particular an object of the present invention to suggest an operator panel and a method for operating an operator panel having one or more applications for operating at least one production system, which operator panel and method, given an interruption in or failure of communication devices, may continue to be used for operating the at least one production system, in a group of operator panels the configurations made on the operator panels being available for all operator panels after the communication devices become available again.

In accordance with the present invention, these goals are attained using the elements in the independent claims. Furthermore, additional advantageous embodiments proceed from the independent claims and the description.

One operator panel having one or more applications for operating at least one production system includes: a configuration data memory that is set up to store configuration data that are provided for configuring the one or more applications of the operator panel; a synchronization module that is set up to access configuration data stored in the configuration data memory and to synchronize these data via a communications interface of the operator panel with configuration data that are stored in a configuration data memory of a remotely disposed operator panel; and a configuration access module that is set up to receive from at least one application of the operator panel a read request for stored configuration data, to access stored configuration data, and to read the stored configuration data corresponding to the read request and to deliver the read configuration data for configuring the at least one application to the at least one application. Using the synchronization module, the stored configuration data are synchronized to remotely disposed operator panels when communications links are available. The operator panels may include stationary operator panels and/or mobile operator panels. The one or more applications for the operator panel are configured based on the stored configuration data. The applications may be configured during start up, installation, or at any other time. Since the stored configuration data are synchronized for the operator panels, in a group of operator panels each operator panel is set up in the same manner for operating the at least one production system. The one or more applications for the operator panel are provided to accomplish control and regulating tasks in different machine parts or components of one or a plurality of production systems.

In one embodiment, the configuration access module is set up to receive from at least one application a change request relating to stored configuration data and to access stored configuration data and to change these data according to the change request, as well as to provide to the at least one application an acknowledgement about the change to the stored configuration data. In a group with a plurality of operator panels, a configuration change may be made for a specific application on each operator panel. Since the stored configuration data are synchronized between the operator panels, such changes are available to all operator panels in the group of operator panels.

In one embodiment, the operator panel further includes a review module that is set up to cooperate with the configuration access module and the synchronization module when stored configuration data are accessed, the review module detecting and capturing one or a plurality of the following events: simultaneous access of stored configuration data by the configuration access module and by the synchronization module, faulty reading and/or faulty changing of stored configuration data, for instance due to a faulty read request and/or change request. The review module in particular ensures that simultaneous changes are not made by synchronizing the configuration data and by the applications for the operator panel. When there is a faulty read request and/or change request, it is ensured that no faulty configuration data are delivered to an application and/or that no faulty stored configuration data result when configuration data are changed.

In one embodiment, the operator panel includes a master-slave module that is set up to define the operator panel as master or slave, the synchronization module being set up, if the operator panel is defined as master, to synchronize configuration data exclusively with a remotely disposed operator panel that is defined as a slave, and if the operator panel is defined as a slave, to synchronize configuration data exclusively with a remotely disposed operator panel that is defined as a master. In a group having a plurality of operator panels, in particular exactly one operator panel is defined as master. Configuration data are synchronized exclusively from one slave to a master or from the master to all slaves. Thus the configuration data are kept synchronous across all operator panels.

In on embodiment, the configuration access module is set up to review, when stored configuration data are accessed, whether the access relates to the configuration data memory of the operator panel or to a configuration data memory of a remotely disposed operator panel and to perform the access to stored configuration data accordingly in the configuration data memory of the operator panel or in a configuration data memory of a remotely disposed operator panel. For certain operator panels it may be established that only a first portion of the configuration data are stored on these specific operator panels and a second portion of configuration data are stored on some other operator panel in the group with a plurality of operator panels, especially on an operator panel configured as a master. In this way even operator panels with a small memory capacity may be included in the group having a plurality of operator panels. The first portion of the configuration data relates in particular to configuration data that must also be available when there is a failure of communications links for the applications for the operator panel.

In one embodiment, for initializing the configuration data memory of the operator panel, the synchronization module is set up to copy stored configuration data from a configuration data memory of a remotely disposed operator panel. If a new operator panel is added to a group of operator panels, this operator panel may be configured rapidly and made available for operating the at least one production system.

In one embodiment, when changing stored configuration data that relates to deleting and/or modifying stored configuration data, the configuration data access module is set up to update a deletion table and/or modification table, the synchronization module being set up to synchronize stored configuration data, taking into account the deletion table and/or the modification table. When there is a temporary failure of communications links, the changes made in the configuration data in one operator panel are updated in the deletion table and/or modification table. Once the communications links are available again, these changes may be synchronized consistent with the other operator panels in the group made of a plurality of operator panels.

In addition to an operator panel having one or more applications for operating at least one production system, the invention relates to a method for operating an operator panel having one or more applications for operating at least one production system. The method for operating an operator panel having one or more applications for operating at least one production system includes: storing configuration data in a configuration data memory of the operator panel, the configuration data being provided for the configuration of the one or more applications for the operator panel; accessing configuration data stored in the configuration data memory of the operator panel and synchronizing these configuration data via a communications interface of the operator panel with configuration data that are stored in a configuration data memory of a remotely disposed operator panel; and receiving, from at least one application of the operator panel, a read request for stored configuration data, accessing stored configuration data in order to read stored configuration data according to the read request, and delivering read configuration data to the at least one application of the operator panel for configuring the at least one application.

In one variant, a change query relating to stored configuration data is received by at least one application and stored configuration data are accessed in order to change these data according to the change request. An acknowledgement about the changing of the stored configuration data is delivered to the at least one application.

In one variant, one or more of the following events are detected and captured when stored configuration data are accessed: simultaneous access to stored configuration data, faulty reading and/or faulty changing of stored configuration data, for instance due to a faulty read request and/or change request.

In one variant, the operator panel is defined as a master or slave, that is, if an operator panel is defined as a master, configuration data are synchronized exclusively with a remotely disposed operator panel, if the operator panel is defined as a slave, configuration data are synchronized exclusively with a remotely disposed operator panel that is defined as a master.

In one variant, when stored configuration data are accessed there is a review of whether the access relates to the configuration data memory of the operator panel or to a configuration data memory of a remotely disposed operator panel and the access to stored configuration data is correspondingly performed in the configuration data memory of the operator panel or in a configuration data memory of a remotely disposed operator panel.

In one variant, for initializing the configuration data memory of the operator panel, stored configuration data are copied from a configuration data memory of a remotely disposed operator panel.

In one variant, when stored configuration data that relate to deleting and/or modifying stored configuration data are changed, a deletion table and/or modification table is/are updated and stored configuration data are synchronized, taking into account the deletion table and/or the modification table.

In addition to an operator panel and a method for operating an operator panel having one or more applications for operating at least one production system, the invention also relates to a computer program product including a tangible, computer-readable storage medium with stored computer code, which product is set up to control one or a plurality of processors of an operator panel having one or more applications for operating at least one production system such that: configuration data are stored in a configuration data memory of the operator panel, the configuration data being provided for configuring the one or more applications of the operator panel; configuration data stored in the configuration data memory of the operator panel are accessed and these configuration data are synchronized with configuration data that are stored in a configuration data memory of a remotely disposed operator panel via a communications interface of the operator panel; and, a read request for stored configuration data is received by at least one application of the operator panel, stored configuration data are accessed in order to read the stored configuration data according to the read request, and read configuration data are delivered to the at least one application of the operator panel for configuring the at least one application.

BRIEF DESCRIPTION OF THE DRAWINGS

The invention is explained in the following using drawings that merely depict exemplary embodiments.

DETAILED DESCRIPTION

Figure 1:
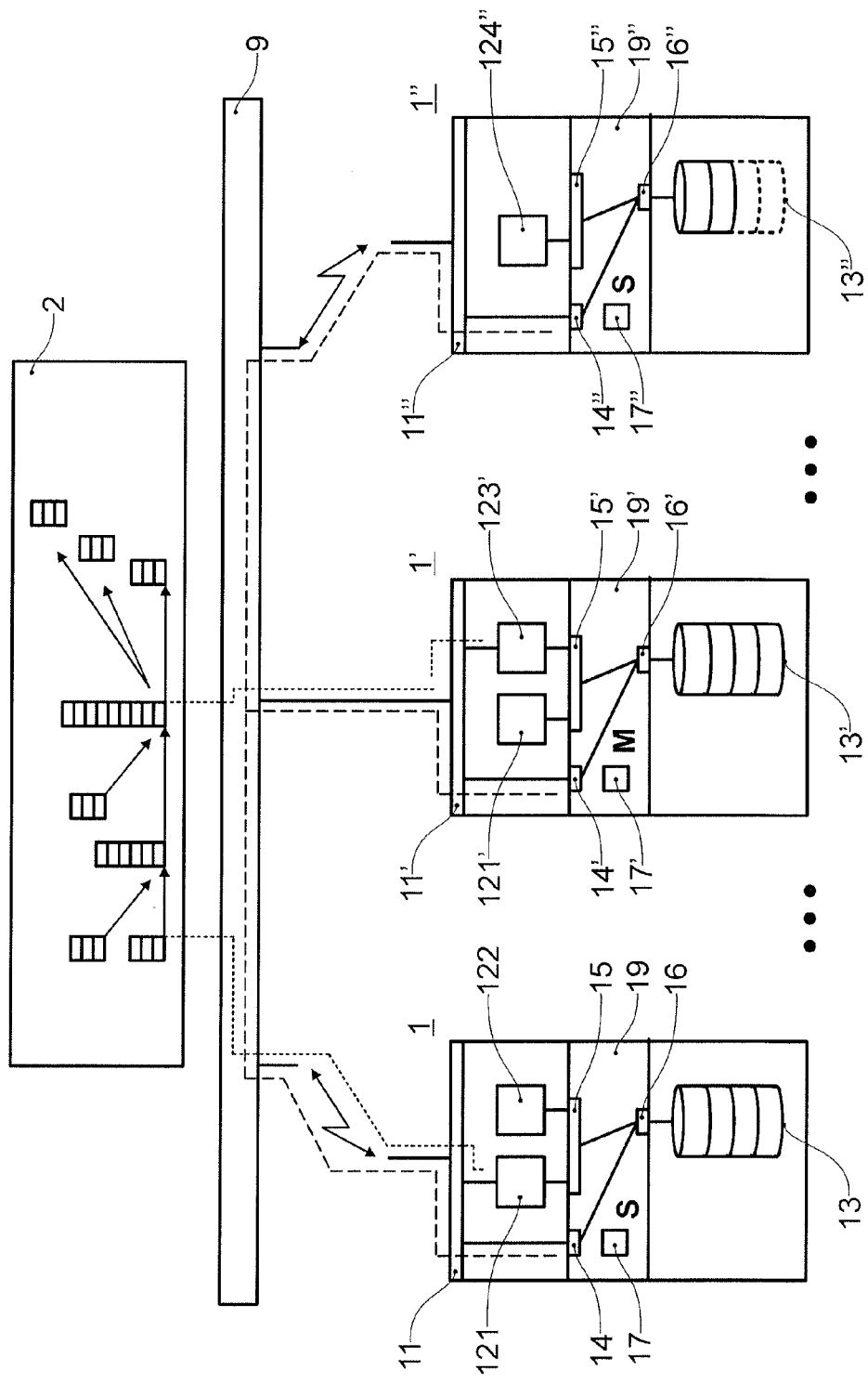
FIG. 1 is a schematic depiction of a plurality of operator panels for at least one production system.

FIG. 1 schematically depicts a plurality of operator panels 1, 1', 1", each having one or more applications 121, 122 that are set up for operating at least one production system 2. The at least one production system 2 includes e.g. a product processing system such as e.g. a sorting or logistics system, a printed product processing system, or some other production system. The at least one production system 2 includes in particular a plurality of machines or production segments. The at least one production system 2 is arranged for instance in a room, hall, building, building complex, quarter with various buildings, etc., and its dimensions measure e.g. from a few meters to a few hundred meters.

The operator panels 1, 1', 1" have a plurality of function modules that are preferably embodied as programmed software modules and include computer programming code for controlling one or a plurality of processors in the operator panels 1, 1', 1". The computer programming code is stored on one or a plurality of computer-readable fixed storage media or removable storage media that can be connected to the processors. However, the person skilled in the art shall understand that the function modules may be designed in somewhat or completely alternative embodiments as a function of hardware components.

As FIG. 1 depicts schematically, a communications device 9 is provided that is set up to make available one or a plurality of communications links, especially among the individual operator panels 1, 1', 1" and between the operator panels 1, 1', 1" and the at least one production system 2.

The one or plurality of communications links established between the individual operator panels 1, 1', 1" are set up to enable the communication that is described in the following between the operator panels 1, 1', 1".

The one or a plurality of communications links established between the operator panels 1, 1', 1" and the at least one production system are in particular set up to forward operating commands to the at least one production system 2 from the operator panels 1, 1', 1" for operating the at least one production system 2. In one variant, status data about the at least one production system 2 are forwarded to the operator panels 1, 1', 1" via the one or plurality of communications links. Operating commands that are generated in particular on the operator panels 1, 1', 1" may include starting or stopping machines, adjusting speeds, turning on auxiliary devices such as lighting, etc. Status data that are detected in particular by sensors attached to the at least one production system 2 may relate to the fill level of a container, the temperature of a machine, the switching status of an auxiliary device such as lighting, etc.

In the following one of the three operator panels 1, 1', 1" depicted in FIG. 1 shall be described in detail. The remaining operator panels 1, 1', 1" depicted in FIG. 1 are constructed essentially identically, but may also have additional and/or other features, as shall be described later.

As FIG. 1 depicts schematically, the operator panel 1 has one or a plurality of communications interfaces 11 that are set up to establish one or a plurality of communications links, especially to the communications device 9, to the at least one production system 2, and/or to remotely disposed operator panels 1', 1". The one or plurality of communications interfaces include in particular contact and/or contactless communications interfaces such as e.g. an Ethernet communications interface, a WLAN (WLAN: Wireless Local Area Network) communications interface, a Bluetooth communications interface, etc. The communications device 9 consequently has in particular Ethernet switches, WLAN access points, Bluetooth communications devices, etc. The communications links between the communications device 9 and the at least one production system 2 include in particular Ethernet communications devices.

As FIG. 1 depicts schematically, the operator panel 1 includes a plurality of applications 121, 122. One or more applications 121, 122 are for instance set up for operating the at least one production system 2 and to this end have especially communications modules in order to establish one or a plurality of communications links to at least one production system 2 for operating the at least one production system 2. In addition to applications 121, 122 that are set up for operating the at least one production system, one or more applications 121, 122 are provided that run locally on the operator panel 1 and do not establish any external communications links such as e.g. to the at least one production system 2. One or more locally running applications 121, 122 are set up for instance to configure the operator panel 1, to perform maintenance tasks on the operator panel 1 such as creating a back-up copy or recovering a back-up copy, etc.

As FIG. 1 depicts schematically, the operator panel 1 includes a configuration data memory 13. The configuration data memory 13 is set up to store configuration data, especially configuration data that are provided for configuring the applications 121, 122 for the operator panel 1. The configuration data for the applications 121, 122 of the operator panel 1 include for instance communications addresses for establishing communications links to the at least on production system 2, minimum and maximum values for the speed setting for a machine in the at least one production system 2, lists with operating functions for machines in the at least one production system 2, etc. The configuration data stored in the configuration data memory 2 are used in particular to define what options the applications 121, 122 have for operating the at least one production system 2, changes to the configuration data also involving changes in the options for operating the at least one production system 2 using the applications 121, 122.

In one embodiment, the configuration data stored in the configuration data memory 13 are divided into shared configuration data and application-specific configuration data, the shared configuration data being provided for the common configuration of a plurality of or all applications 121, 122 and the application-specific configuration data being provided for the application-specific configuration of an individual or of individual applications 121, 122. Thus the shared configuration data include for instance a communications address at which a communications link to the at least one production system 2 may be established, while the application-specific configuration data includes for instance for each of the applications 121, 122 an identification code that defines which of the machines in the at least one production system is to be operated by the relevant application 121, 122.

In one embodiment, one or more applications 121, 122 cooperate with a user interface of the operator panel 1. The user interface is in particular set up to indicate to a user of the operator panel 1 one or a plurality of operating commands available for operating the at least one production system 2 and to forward for instance operating commands selected by the user to the appropriate applications 121, 122, which are set up, based on the selected operating command, to operate the at least one production system 2 accordingly, that is, e.g. to start or stop a machine, to adjust the speed of a conveyor belt, etc.

The user interface of the operator panel 1 includes in particular input/output devices such as for instance a touchscreen, keypad, display, camera, microphone, loudspeaker, etc. Depending on the use or user default, the user interface is set up as a graphic user interface, speech-based user interface, gesture-based user interface etc. In a graphic user interface, for instance, an operating command for operating the at least one production system 2 is displayed on a touchscreen or display of the operator panel and initiated by the user when the user touches the touchscreen at the appropriate location or actuates one or a plurality of keys on a keyboard. In an acoustic user interface, for instance, operating commands for operating the at least one production system 2 are initiated by speaking sentences or by spoken commands. In a gesture-based user interface, for instance, operating commands for operating the at least one production system 2 are initiated by gestures such as in particular finger gestures, hand gestures, arm gestures, etc.

As FIG. 1 depicts schematically, the operator panel 1 includes a configuration data memory 13 that is set up to store configuration data that are provided for configuring one or more applications 121, 122 in the operator panel. For instance, the configuration data define which functionalities are available to the applications 121, 122 at the run time, that is, e.g. which functions of a machine of the at least one production system 2 may be operated by the relevant applications 121, 122, i.e. whether the machine may only be started and stopped, for instance, or whether the speed of the machine may also be adjusted.

As FIG. 1 depicts schematically, the operator panel 1 includes a synchronization module 14 that is set up to access configuration data stored in a configuration data memory 13 for the operator panel 1 and to synchronize these with configuration data that are stored in a configuration data memory 13', 13" of a remotely disposed operator panel 1', 1" via a communications interface 11 of the operator panel 1. The configuration data are synchronized in particular via a communications link that is established via a communications interface 11 and that is between the operator panel 1 and a remotely disposed operator panel 1', 1". During the synchronization, the [sic] in the configuration data memory 13 for the operator panel 1 are reconciled with configuration data that are stored in a configuration data memory 13', 13" of a remotely disposed operator panel 1', 1".

During the synchronization of the configuration data, for instance in a first step a communications link from the operator panel 1 to a remotely disposed operator panel 1', 1" is established via the communications interface 11. In a second step, for instance the configuration data stored in the configuration data memory 13 are compared to the remotely disposed configuration data that are stored in the configuration data memory 13', 13" for the remotely disposed operator panel 1', 1". If a difference is found between the configuration data and the remotely disposed configuration data, for instance in a third step a synchronization direction is established, in particular it is determined based on a time stamp which data are from the more recent date. The older data are then overwritten, for instance in a fourth step, by the newer data in the relevant configuration data memory 13, 13', 13". In one embodiment, some other criterion is used to determine which data are to be kept and which data are to be overwritten. After the synchronization, the data that are stored in the configuration data memory 13 for the operator panel 1 are consistent with the data that are stored in a remotely disposed configuration memory 13', 13" of a remotely disposed operator panel 1', 1".

As FIG. 1 depicts schematically, the operator panel 1 includes a configuration access module 15 that is set up to receive from the applications 121, 122 read requests for configuration data stored in the configuration data memory 13. The configuration access module 15 is set up to execute the received read requests, i.e., to access stored configuration data and to read the requested configuration data out of the configuration data memory 13, and then to deliver the read-out configuration data to the applications 121, 122. A read request includes for instance an identifier with which configuration data stored in the configuration data memory 13 are identified, for instance in the form of a string such as e.g. "Communications address of the production system." The read-out configuration data are delivered to the application 121, 122 for instance in the form a string, such as e.g. "192.168.0.50."

In one embodiment, the configuration access module 15 is set up to receive change requests for changing configuration data in the configuration data memory 13 and to access and change configuration data stored in the configuration data memory 13 according to the change request. The change request includes for instance a write request, a delete request, a modification request, etc. Write requests and modification requests include in particular an identifier, e.g. in the form of a string such as for instance "Maximum speed of the conveyor," and a configuration value, e.g. in the form of a string such as for instance "5 m/s." For a write request, for instance the identifier is written into the stored configuration data together with the configuration value. For the modification request, the stored configuration data are searched according to identifier and the stored configuration values are modified. In one variant, the configuration access module 15 is set up to deliver to the relevant application 121, 122 an acknowledgement of the change made to the configuration data after the configuration data in the configuration data memory 13 have been changed.

In one embodiment, the configuration access module 15 is set up to provide to the synchronization module 14 an appropriate signal after a change request has been received and after the configuration data have been changed. The synchronization module 14 is for instance set up to execute a synchronization of configuration data based on the signal. The signal contains for instance information about the changed configuration data so that the synchronization module does not first have to determine which configuration data are to be synchronized.

In one embodiment, the synchronization module 14 is set up to initiate a synchronization based on one or a plurality of the following events: lapse of a time interval; availability of a communications link, especially after an interruption; reset or first-time start-up of the operator panel 1; receipt of a signal from the configuration access module 15, from a remotely disposed operator panel 1', 1", and/or from some other transmitter. In one embodiment, the synchronization module 14 is set up to copy configuration data from a configuration data memory 13', 13" of a remotely disposed operator panel 1', 1" for initializing the configuration data memory 13 for the operator panel 1.

The configuration data memory 13 is contained for instance in a non-volatile memory for the operator panel 1, for instance in a memory card, an SSD drive (SSD: solid state drive), etc. The configuration data memory 13 is set up to store the information for configuring the applications 121, 122 in the form of configuration data. In one embodiment, the configuration data memory 13 includes a file system in which configuration data are stored, especially in directories and subdirectories and files stored therein that include configuration data. In another embodiment, the configuration data memory 13 includes a data base system, for instance an SQL data base system (SQL: structured query language), in which configuration data are stored.

In one embodiment, the synchronization module 14 and the application access module 15 are combined in a memory control unit 19. The memory control unit 19 is embodied for instance as a software module that is arranged in particular between the applications 121, 122 and the configuration data memory 13, the applications 121, 122 and the configuration data memory 13 cooperating with the memory control unit 19. The applications 121, 122 access the configuration data memory 13 for reading configuration data and for writing configuration data via the memory control unit 19, which acts like a configuration data memory 13 with respect to the applications 121, 122. In one embodiment, the synchronization module 14 is covered with respect to the applications 121, 122 by the memory control unit 19 so that transparent access to configuration data is available to the applications, the configuration data being synchronized among the operator panels 1, 1', 1". Operator panels 1, 1', 1" can be supplemented with such a memory control unit, especially with the functionality of configuration data synchronized between the operator panels 1, 1', 1", and specifically in particular without the applications 121, 122 installed on the operator panels 1, 1', 1" having to be modified.

In one embodiment, the operator panel 1 includes, as depicted schematically in FIG. 1, a review module 16 that is set up to cooperate with the configuration access module 15 and the synchronization module 14 when stored configuration data are accessed, in particular one or more of the following events being detected and captured by the review module 16: simultaneous access to stored configuration data by the configuration access module 15 and the synchronization module 14, faulty reading and/or changing of stored configuration data, in particular due to a faulty read request and/or change request.

For instance, if the synchronization module 14 has not finished accessing the configuration memory 13 and there is a simultaneous access by the configuration access module 15, the access by the configuration access module 15 is for instance received by the review module 16 but delayed until the access by the synchronization access module 14 has concluded and all necessary data have been delivered. Only then is the access executed by the review module 16 and the required configuration data are changed.

The review module 16 is set up for instance, when changing configuration data, for first receiving the complete change request together with the configuration data to be changed and only then executing the change in the configuration memory 13. If, for instance, when receiving the change request the relevant application crashes and supplies only an incomplete change request, then the review module 16 simply discards the incomplete change request. This ensures that the configuration data in the configuration data memory 13 are kept consistent, even if there is a malfunction or premature termination of an application.

In one embodiment, as is depicted schematically in FIG. 1, the operator panel 1 is a master-slave module 17 that is set up to define the operator panel 1 as master or slave. When the operator panel 1 is defined as master, for instance, the synchronization module 14 is set up to synchronize configuration data exclusively to a remotely disposed operator panel 1', 1" defined as a slave, and when the operator panel 1 is defined as a slave, to synchronize configuration data exclusively to a remotely disposed operator panel 1', 1" defined as master.

The master-slave module 17 includes for instance a memory cell in which the string "S" is stored if the operator panel 1 is defined as a slave and in which the string "M" is stored if the operator panel 1 is defined as master. In one variant, if the operator panel 1 is defined as a slave, in addition a communications address is stored that is associated with a remotely disposed operator panel 1', 1" that is defined as the master. When there is a plurality of operator panels 1, 1', 1", only a single operator panel 1, 1', 1" is defined as the master, for instance, and all other operator panels 1, 1', 1" are defined as slaves. FIG. 1 depicts this schematically, the operator panel with the reference number 1' being defined as the master and the operator panels having the reference numbers 1, 1" being defined as slaves. To ensure that only a single operator panel 1, 1', 1" is defined as master and the other operator panels 1, 1', 1" are defined as slaves, it is possible to configure the operator panels 1, 1', 1" statically, i.e. in the master-slave module 17 it is statically determined whether a specific operator panel 1, 1', 1" is the master or a slave. The classification as master or slave may also be made dynamically in that the operator panels 1, 1', 1" communicate for instance via a broadcast address and establish dynamically which of the operator panels 1, 1', 1" is to be defined as master. To this end, for instance an index relating to availability may be dynamically associated with the operator panels 1, 1', 1", for instance in that a delay is determined for all possible communications partners and the operator panel 1, 1', 1" in which the total number of the delays is the smallest is established as master. Static allocation as master and slave has the advantage that there are no dynamic problems relating to determining the slave to be overcome. If the operator panel 1, 1', 1" defined as the master fails, however, for instance due to a system crash or lack of communications links, one of the remaining slaves must be defined as the master.

In one variant, when there are changes to configuration data stored in the configuration data memory 13, an operator panel defined 1 a slave is set up to synchronize these changes only with the remotely disposed operator panel 1', 1" defined as the master. There is no synchronization with a remotely disposed operator panel 1', 1" defined as a slave.

In one variant, when there are changes to configuration data stored in the configuration data memory 13, an operator panel 1 defined as the master is set up to synchronize these changes with all remotely disposed operator panels 1', 1" defined as slaves. The operator panel 1 defined as the master includes for instance a table with communications addresses for the remotely disposed operator panels 1', 1" defined slaves. This table is for instance configured statically or is updated dynamically based on requests to the operator panels defined as slaves for a broadcast address relating to the communications address.

In one embodiment, when configuration data are accessed, the configuration access module 15 is set up to review whether the access should be to the configuration data memory 13 for the operator panel 1 or to the configuration data memory 13', 13" of a remotely disposed operator panel 1', 1" and to execute the access to configuration data accordingly from the configuration data memory 13 for the operator panel 1 or the configuration data memory 13', 13" of a remotely disposed operator panel 1', 1". Thus for instance an operator panel 1 that is embodied as an embedded computer, that is, an operator panel 1 that has only limited or minimal components, has only a limited memory capacity or has a memory such as e.g. an SSD drive (SSD: solid state disk), in which the number of write cycles is limited. The configuration access module 15 is consequently set up to take this circumstance into consideration and to minimize access to the configuration data memory 13 for the operator panel 1. Instead, configuration data from remotely disposed operator panels 1', 1" are accessed. In one embodiment, the configuration access module 15 is set up to differentiate between essential and non-essential data, the configuration data memory 13 for the operator panel 1 being accessed for the essential configuration data and the configuration data memory 13', 13" of a remotely disposed operator panel 1', 1" being accessed for the non-essential configuration data. Essential configuration data may for example relate to user commands that are available to an application 121, 122. Non-essential configuration data may for example relate to user settings that define the color scheme or layout according to which a user interface of the operator panel 1 is configured when an application 121, 122 works with the user interface. The essential configuration data are also available on the operator panel 1 during a failure of communications links, so that the essential functionalities of the applications 121, 122 for operating the at least one production system 2 are assured.

In one embodiment, when changing stored configuration data that relate to deleting and/or modifying stored configuration data, the configuration data access module 15 is set up to update a deletion table and/or modification table, the synchronization module 14 being set up to synchronize stored configuration data, taking into account the deletion table and/or the modification table. In particular deletion and/or modification of configuration data must not take place immediately after an interruption of communications links established via the communications interface 11 to remotely disposed operator panels 1', 1". If the operator panel 1 is not able, during a certain period of time, to synchronize changes to the configuration data stored in the configuration data memory 13 with remotely disposed operator panels 1, 1', then during this period of time all changes such as the deletion and/or modification of configuration data stored in the configuration data memory 13 are recorded. As soon as communications links to remotely disposed operator panels 1', 1" can be re-established, first the deleted and/or modified configuration data are also deleted and/or modified on the remotely disposed operator panels 1, 1'.

Figure 2:
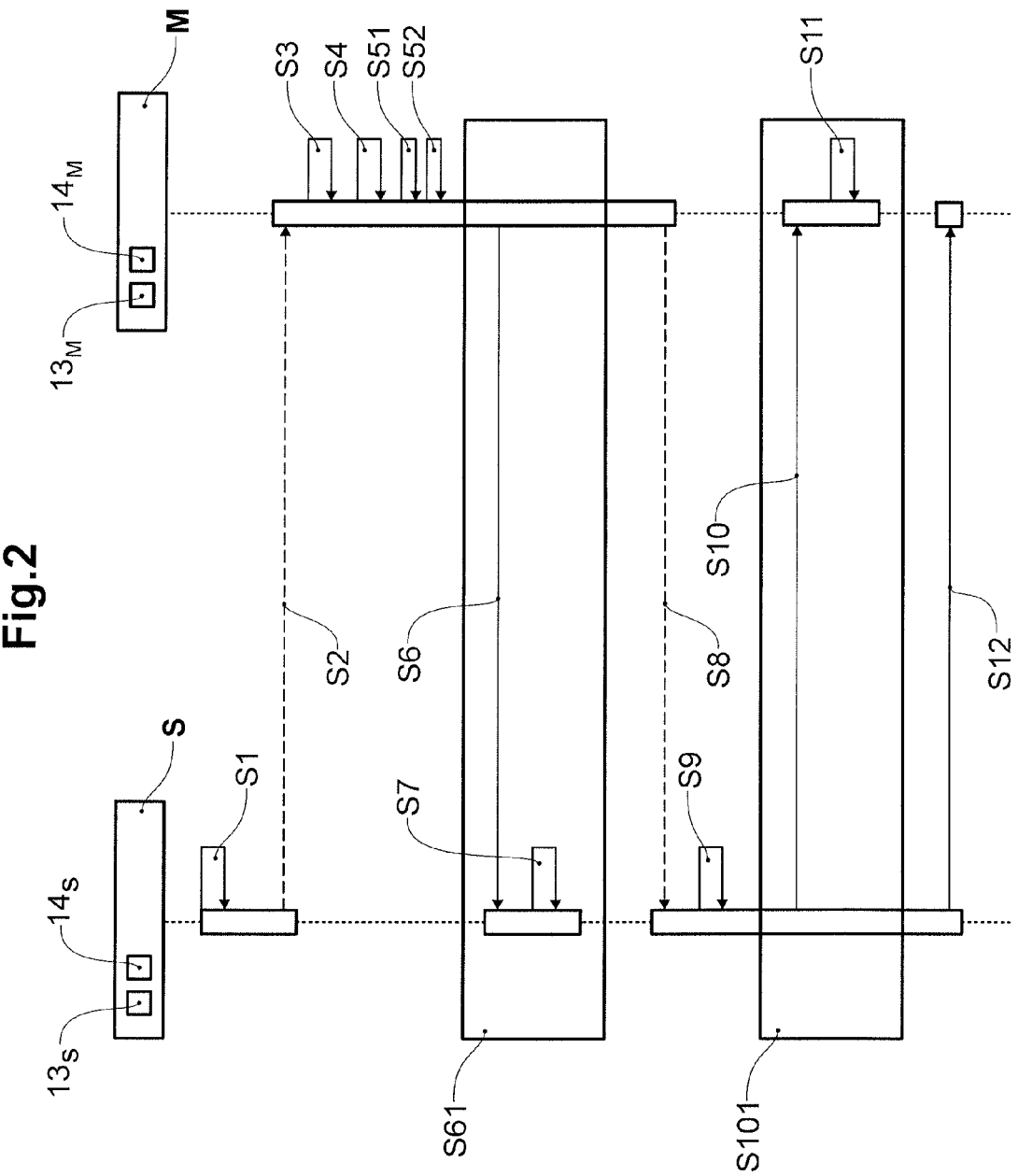
FIG. 2 is a schematic depiction of the synchronization sequence between an operator panel configured as a slave and an operator panel configured as a master; and, FIG. 3 is a schematic depiction of the sequence when deleting configuration data in the configuration memory of operator panels configured as slaves.

FIG. 2 depicts schematically the synchronization sequence between an operator panel S configured as a slave and an operator panel M configured as master M, which have the described devices, that is in particular each has a configuration data memory $13_S$, $13_M$ and each has a synchronization module $14_S$, $14_M$. The synchronization modules $14_S$, $14_M$ for the slave and for the master are set up to synchronize the configuration data stored in each of the configuration storage memories $13_S$, $13_M$ according to the following steps. In the following the operator panel S configured as a slave is also called slave S and the operator panel M configured as master is also called master M.

In step S1 all files are found that [are] found in a directory and where applicable in a subordinate directory tree of the configuration data memory $13_S$ of the slave S. A file list is created with the files stored on the slave S, which list contains for every file the relative path together with the file name and the last change date for the file.

In step S2 the file list found for the slave S is forwarded to the master M.

In step S3, files that have already been deleted are handled, i.e. if for instance a file was deleted on the slave S and is still present on the master M, this file is deleted on the master M.

In step S4, all files on the master are found and in particular a file list is created with the files stored on the master M.

In step S51 and step S52, the file lists found are compared and additional file lists are created.

In step S51, a file list is created with files to be copied from the slave S to the master M, which list contains all files that are present on the slave S but not on the master M and which list contains all files that are newer on the slave S than on the master M.

In step S52, a file list is created, with file names and their file contents, of files that are present on the master M but not on the slave S, and of files that are newer on the master M than on the slave S. This file list, which contains file names and their file contents, is to be transmitted from the master M to the slave S. For the transmission, which occurs in step S6, the files are divided into packets that do not exceed a predetermined size. The packets are then transmitted individually from the master M to the slave S, each packet being stored on the slave in step S7. In step S61, the transmission is executed in a loop for all packets.

In step S8, once all the packets have been transmitted in accordance with step S6 and step S61, the file list with files to be copied from the slave S to the master M is transmitted from the master M to the slave S. Based on this file list, in step S9 packets with the corresponding files are created that have a maximum size. In step S10, the packets are transmitted from the slave S to the master M, the transmitted packets being stored on the master in step S11. In step S101, the packets are transmitted in a loop until all data have been transmitted. At the end, the master M is notified of this in step S12, for instance in that a corresponding message is transmitted to the master M.

After steps S1 through S12 have been executed, the configuration data stored in the configuration data memory 13' of the slave S are synchronized with the configuration data stored in the configuration data memory 13 of the master M.

During the synchronization of the configuration data, it is ensured that no other slaves contact the master M and these are blocked for the synchronization. On the slave S it is likewise ensured that the configuration data stored in the configuration data memory 13 are blocked during the synchronization. This prevents the possibility of there being an inconsistent status for the configuration data.

FIG. 3 depicts schematically the sequence when configuration data in the configuration memories $13_S$, $13_S'$, $13_S''$ of operator panels S, S', S", which are configured as slaves, are deleted, that is, in particular it depicts deletion of a file in the slaves S, S', S".

In step S1 a message is created on the master M for all connected slaves S, S' to delete the file in question. As FIG. 3 depicts schematically, the message is transmitted in step S2 and in step S3 to the connected slaves S, S'. The master M includes a list with known slaves. In step S1, the file to be deleted with the current date is stored in a deletion list for all slaves that are presented in the list with known slaves but are not connected. The current data also includes in particular the current time. Furthermore in step S1, all slaves that are not (any longer) presented in the list with known slaves are removed from the deletion list.

In step S4, the slave with the reference number S" re-connects with the master M and signals this to the master M in step S5. On the master there is a review of whether there is an entry for this slave S" on the deletion list. If there is an entry, there is a review of whether the change date for the file on the slave S" to be deleted is newer than the date on which the file was deleted. In this case the file was re-created since the deletion on the slave S" and is therefore not deleted on the slave S", but rather due to synchronization it is distributed again to all other operator panels S, S'. If the change date is not newer than the deletion date of the file, in step S7 during synchronization the file name is provided to the slave S" for deletion and the slave S" deletes the file on the slave S". In both cases the entry for the relevant file is removed from the deletion list on the master M.

In one particular embodiment, one or more applications 121, 122 include parameterization data with which for instance the configuration data to be used for the relevant application 121, 122 are defined. The parameterization data are preferably likewise synchronizable, for instance in that an image or partial representation of current parameterization data are stored in the configuration data memory 13 and in that applications 121, 122 review for instance at regular intervals whether parameterization data have changed and these are reloaded where necessary. The parameterization data 121, 122 may be provided for instance in a dynamic memory area of the operator panels 1, 1', 1", e.g. in RAM (random access memory) of the operator panels 1, 1', 1".

In another embodiment it is provided that a signal is transmitted about changes in the configuration data memory 13 in the form of a broadcast to the operator panels 1, 1', 1" connected to the communications device 9 or is transmitted to a clearing server of the communications device 9, for instance by the configuration access module 15. The operator panels 1, 1', 1" are set up to receive such a broadcast or to obtain the information from the clearing server. In this way the operator panels 1, 1', 1" are informed about the changes to data in a configuration data memory 13. The operator panels 1, 1', 1" are in particular set up, after determining that data have changed in a configuration data memory 13, to decide independently whether a synchronization is necessary or reasonable. This makes it possible for it not to be necessary to synchronize the configuration data, e.g. if the available residual capacity of a battery for an operator panel 1, 1', 1" appears to make synchronization risky or not useful.

In one embodiment, the synchronization module 14 and the configuration data memory 13 are combined in one unit. For instance, the synchronization module 14 is a component of the configuration data memory. In another variant, this unit includes the configuration access module 15. By combining modules into one unit in this manner, existing operator panels 1, 1', 1" may be rapidly and simply provided with the essential inventive features.

In one variant, the master-slave module 17 is embodied as a data flag that is stored in particular in the configuration data memory 13. For instance the synchronization module 14 is set up to except some memory areas of the configuration data memory 13 from the synchronization, in particular a master-slave module 17 embodied as a data flag. Thus data that e.g. contain location information, battery status information, etc., for which synchronization does not make any sense may also be excluded from the synchronization.

In one variant, a transaction conclusion test is provided that checks whether the storage of configuration data in the configuration data memory 13 is complete. If for instance a first synchronization is begun upon expiration and a second synchronization is started at the same time, the transaction conclusion test can ensure that there are no conflicts.

In another variant it is provided that the functions of the operator panel are blocked during a synchronization so that operation of the production system does not occur based on incomplete or no longer current configuration data with the one or more applications 121, 122. This can in particular improve safety when operating the production system.

What is claimed is:

1. An operator panel having at least one processor for executing one or more applications for operating at least one production system, including:
 a configuration data memory configured to store configuration data that are provided for configuring the one or more applications of the operator panel;
 a synchronization module configured to:
  access configuration data stored in the configuration data memory,
  synchronize the configuration data via a communications interface of the operator panel with remote configuration data that are stored in a configuration data memory of a remotely disposed operator panel, the remote configuration data being provided for configuring one or more applications of the remotely disposed operator panel, and
  during synchronization of the configuration data with the remote configuration data,
   identify differences between the configuration data and the remote configuration data based, at least in part, on a comparison between the configuration data and the remote configuration data;
   update and store at least one of the configuration data or the remote configuration data based, at least in part, on the identified differences, resulting in stored configuration data; and
   enable that synchronization of configuration data for configuring the one or more applications includes transmitting, from the operator panel, locally changed configuration data to the remotely disposed operator panel and receiving in the operator panel remotely changed configuration data from the remotely disposed operator panel; and,
 a configuration access module configured to receive from at least one application of the operator panel a read request for stored configuration data, to access stored configuration data, and to read the stored configuration data corresponding to the read request and to deliver the read configuration data for configuring the at least one application to the at least one application.

2. The operator panel in accordance with claim 1, wherein the configuration access module is further configured to receive from at least one application a change request relating to stored configuration data and to access stored configuration data and to change these data according to the change request, and to provide to the at least one application an acknowledgement about the change to the stored configuration data.

3. The operator panel in accordance with claim 1, further comprising a review module configured to cooperate with the configuration access module and the synchronization module when stored configuration data are accessed, the review module detecting and capturing at least one of the following events: simultaneous access of stored configuration data by the configuration access module and by the synchronization module, faulty reading and/or faulty changing of stored configuration data.

4. The operator panel in accordance with claim 1, further comprising a master-slave module configured to define the operator panel as a master or a slave, the synchronization module configured, if the operator panel is defined as the master, to synchronize configuration data exclusively with a remotely disposed operator panel that is defined as the slave, and if the operator panel is defined as the slave, to synchronize configuration data exclusively with a remotely disposed operator panel that is defined as the master.

5. The operator panel in accordance with claim 1, wherein the configuration access module is configured to review, when stored configuration data are accessed, whether the access relates to the configuration data memory of the operator panel or to a configuration data memory of a remotely disposed operator panel and to perform the access to stored configuration data accordingly in the configuration data memory of the operator panel or in a configuration data memory of a remotely disposed operator panel.

6. The operator panel in accordance with claim 1, wherein, for initializing the configuration data memory of the operator panel, the synchronization module is configured to copy stored configuration data from a configuration data memory of a remotely disposed operator panel.

7. The operator panel in accordance with claim 1, wherein, when changing stored configuration data that relates to deleting and/or modifying stored configuration data, the configuration data access module is configured to update a deletion table and/or modification table, the synchronization module configured to synchronize stored configuration data, taking into account the deletion table and/or the modification table.

8. A method for operating an operator panel having one or more applications for operating at least one production system, including:
　storing configuration data in a configuration data memory of the operator panel, the configuration data being provided for the configuration of the one or more applications for the operator panel;
　accessing configuration data stored in the configuration data memory of the operator panel;
　synchronizing the configuration data via a communications interface of the operator panel with remote configuration data that are stored in a configuration data memory of a remotely disposed operator panel, the remote configuration data being provided for configuring one or more applications of the remotely disposed operator panel;
　during synchronizing of the configuration data with the remote configuration data,
　　identifying differences between the configuration data and the remote configuration data based, at least in part, on a comparison between the configuration data and the remote configuration data;
　　updating and storing at least one of the configuration data or the remote configuration data based, at least in part, on the identified differences, resulting in stored configuration data; and,
　　enabling that synchronization of configuration data for configuring the one or more applications includes transmitting from the operator panel locally changed configuration data to the remotely disposed operator panel and receiving in the operator panel remotely changed configuration data from the remotely disposed operator panel; and,
　receiving, from at least one application of the operator panel, a read request for stored configuration data, accessing stored configuration data in order to read stored configuration data according to the read request, and delivering read configuration data to the at least one application of the operator panel for configuring the at least one application.

9. The method in accordance with claim 8, wherein a change query relating to stored configuration data is received by at least one application and stored configuration data are accessed in order to change these data according to the change request, an acknowledgement about the changing of the stored configuration data being delivered to the at least one application.

10. The method in accordance with claim 8, wherein one or more of the following events are detected and captured when stored configuration data are accessed: simultaneous access to stored configuration data, faulty reading and/or faulty changing of stored configuration data.

11. The method in accordance with claim 8, wherein the operator panel is defined as a master or a slave, and if an operator panel is defined as the master, configuration data are synchronized exclusively with a remotely disposed operator panel that is defined as the slave, and if the operator panel is defined as the slave, configuration data are synchronized exclusively with a remotely disposed operator panel that is defined as the master.

12. The method in accordance with claim 8, wherein when stored configuration data are accessed there is a review of whether the access relates to the configuration data memory of the operator panel or to a configuration data memory of a remotely disposed operator panel and the access to stored configuration data is correspondingly performed in the configuration data memory of the operator panel or in a configuration data memory of a remotely disposed operator panel.

13. The method in accordance with claim 8, wherein for initializing the configuration data memory of the operator panel, stored configuration data are copied from a configuration data memory of a remotely disposed operator panel.

14. The method in accordance with claim 8, wherein when stored configuration data that relate to deleting and/or modifying stored configuration data are changed, a deletion table and/or modification table is/are updated and stored configuration data are synchronized, taking into account the deletion table and/or the modification table.

15. A computer program product including a non-transitory computer-readable storage medium with stored computer code, which product is set up to control one or a plurality of processors of an operator panel having one or more applications for operating at least one production system such that:
　configuration data are stored in a configuration data memory of the operator panel, the configuration data being provided for configuring the one or more applications of the operator panel;
　configuration data stored in the configuration data memory of the operator panel are accessed and the configuration data are synchronized with remote configuration data that are stored in a configuration data memory of a remotely disposed operator panel via a communications interface of the operator panel, the remote configuration data being provided for configuring one or more applications of the remotely disposed operator panel, and during synchronization of the configuration data with the remote configuration data, differences between the configuration data and the remote configuration data are identified based, at least in part, on a comparison between the configuration data and the remote configuration data;

at least one of the configuration data or the remote configuration data are updated and stored based, at least in part, on the identified differences, resulting in stored configuration data; and, enable that synchronization of configuration data for configuring the one or more applications includes transmitting from the operator panel locally changed configuration data to the remotely disposed operator panel and receiving in the operator panel remotely changed configuration data from the remotely disposed operator panel; and, a read request for stored configuration data is received by at least one application of the operator panel, stored configuration data are accessed in order to read the stored configuration data according to the read request, and read configuration data are delivered to the at least one application of the operator panel for configuring the at least one application.

* * * * *